10 Sheets—Sheet 1.

M. L. GORHAM, dec'd.
H. M. Gorham, Executrix.
Grain Binder.

No. 233,089. Patented Oct. 12, 1880.

Witnesses:
A. O. Behel,
N. D. Frost.

Inventor
Helen M. Gorham
Executrix of
Marquis L. Gorham
Per Jacob Behel,
Atty.

10 Sheets—Sheet 2.

M. L. GORHAM, dec'd.
H. M. GORHAM, Executrix.
Grain Binder.

No. 233,089. Patented Oct. 12, 1880.

M. L. GORHAM, dec'd.
H. M. GORHAM, Executrix.
Grain Binder.

No. 233,089. Patented Oct. 12, 1880.

Witnesses:
A. O. Behel.
N. D. Frost.

Inventor.
Helen M. Gorham,
Executrix of
Marquis L. Gorham.
Per Jacob Behel.
Atty.

M. L. GORHAM, dec'd.
H. M. GORHAM, Executrix.
Grain Binder.

No. 233,089.   Patented Oct. 12, 1880.

M. L. GORHAM, dec'd.
H. M. GORHAM, Executrix.
Grain Binder.

No. 233,089. Patented Oct. 12, 1880.

Witnesses.
A. D. Behel
19. O. Kross

Inventor.
Helen M. Gorham
Executrix of
Marquis L. Gorham
Per Jacob Behel.
Atty

M. L. GORHAM, dec'd.
H. M. GORHAM, Executrix.
Grain Binder.

10 Sheets—Sheet 7.

No. 233,089.

Patented Oct. 12, 1880.

Witnesses
A. O. Behel
N. O. Loris

Inventor:
Helen M. Gorham,
Executrix of
Marquis L. Gorham,
Per Jacob Behel,
Atty.

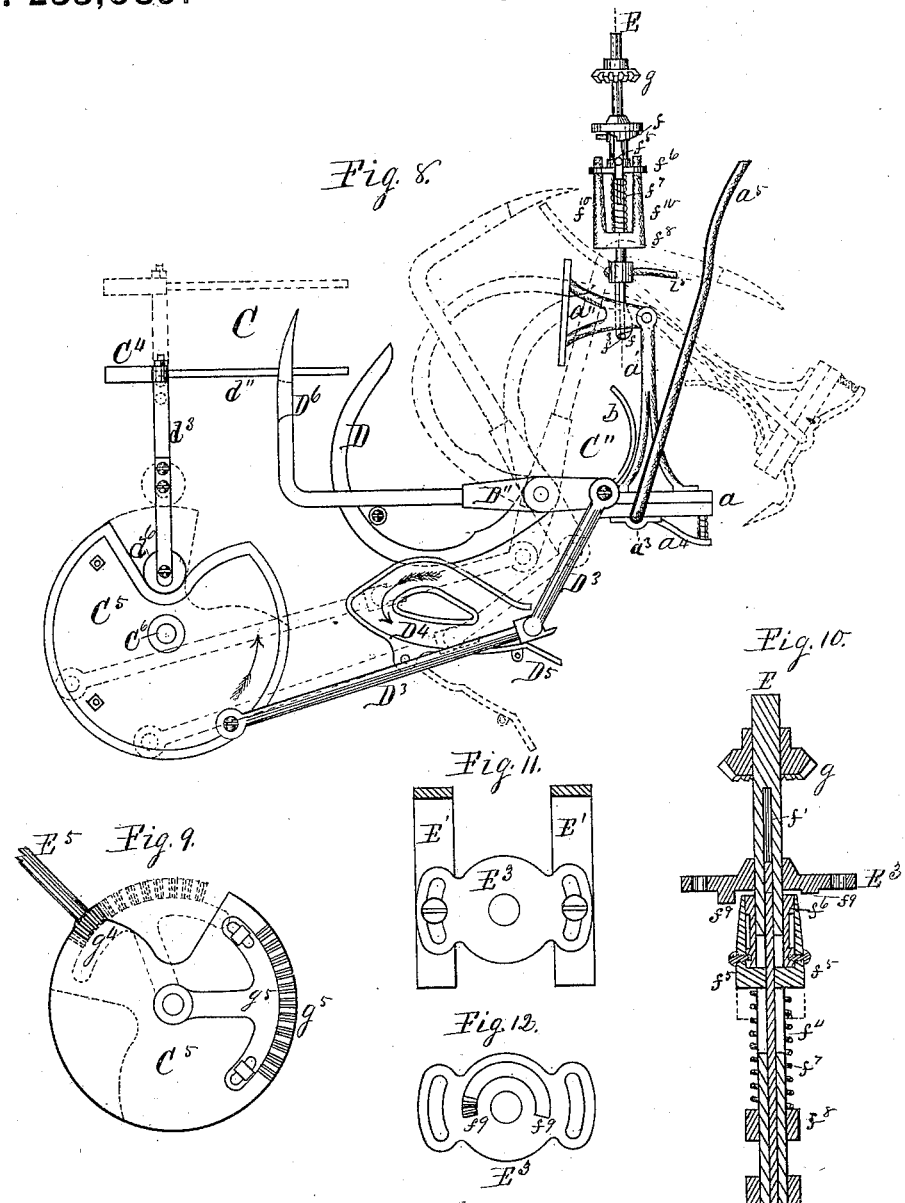
M. L. GORHAM, dec'd.
H. M. GORHAM, Executrix.
Grain Binder.
No. 233,089. Patented Oct. 12, 1880.

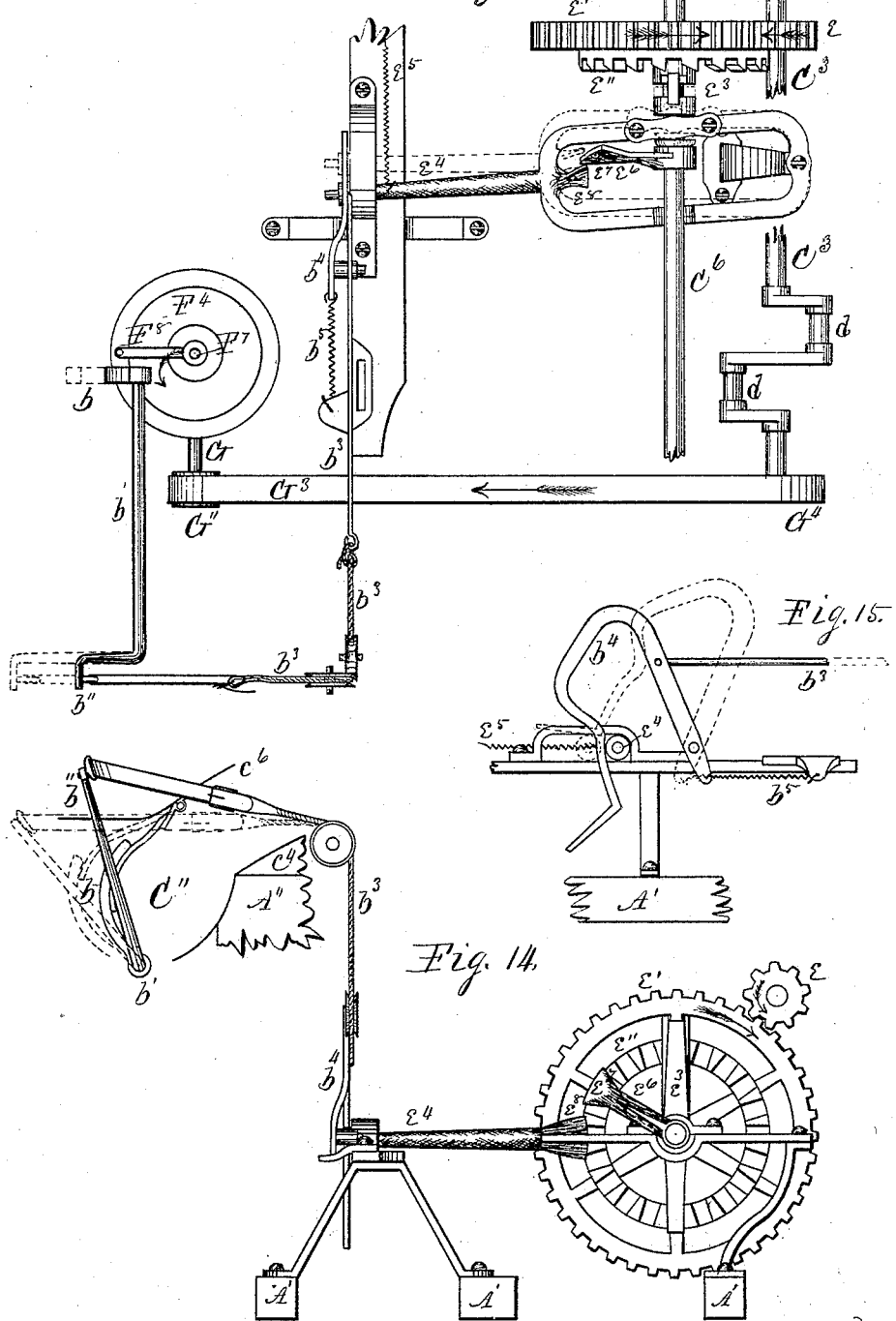

M. L. GORHAM, dec'd.
H. M. GORHAM, Executrix.
Grain Binder.

No. 233,089.

Patented Oct. 12, 1880.

Witnesses.
A. D. Behel
N. D. Krock

Inventor.
Helen M. Gorham
Executrix of
Marquis L. Gorham
Per Jacob Behel
Atty.

UNITED STATES PATENT OFFICE.

HELEN M. GORHAM, (EXECUTRIX OF MARQUIS L. GORHAM, DECEASED,) OF ROCKFORD, ILLINOIS.

GRAIN-BINDER.

SPECIFICATION forming part of Letters Patent No. 233,089, dated October 12, 1880.

Application filed July 23, 1878.

*To all whom it may concern:*

Be it known that MARQUIS L. GORHAM, deceased, late of the city of Rockford, in the county of Winnebago and State of Illinois, did, in his lifetime, invent a new and useful Improvement in Grain-Binding Machines, of which the following is a specification.

The object of this invention is to improve the grain-binding machine invented and patented by the said Marquis L. Gorham, the Letters Patent for which were issued February 9, 1875, and numbered 159,506.

Figure 1:
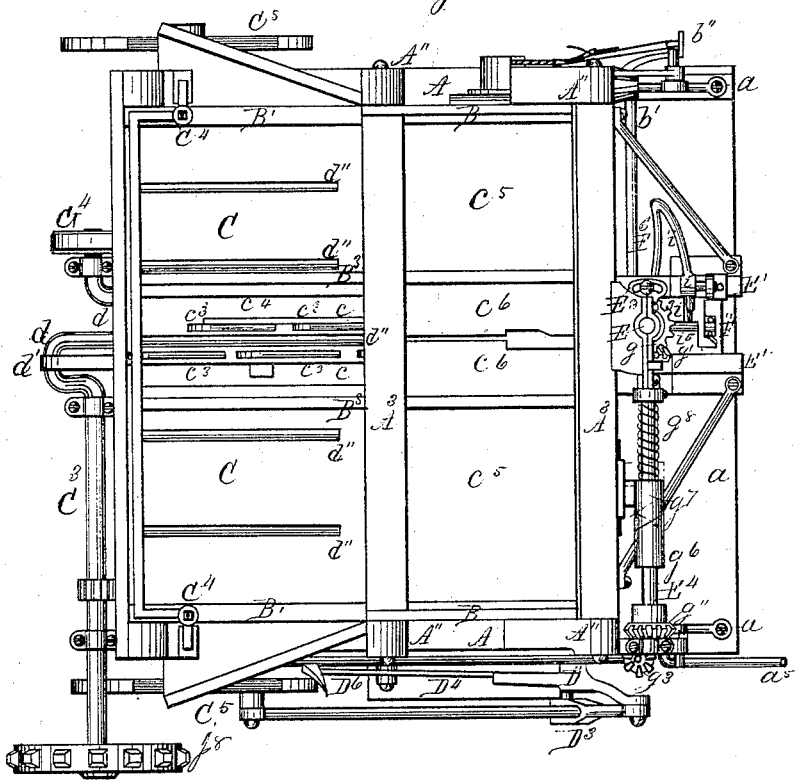
Figure 2:
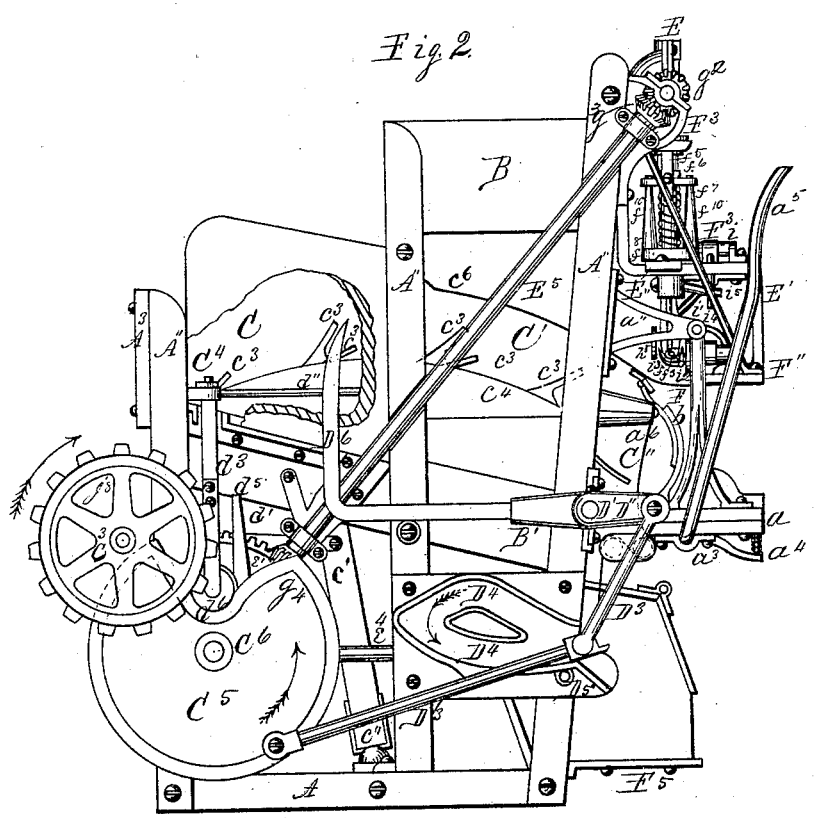
Figure 3:
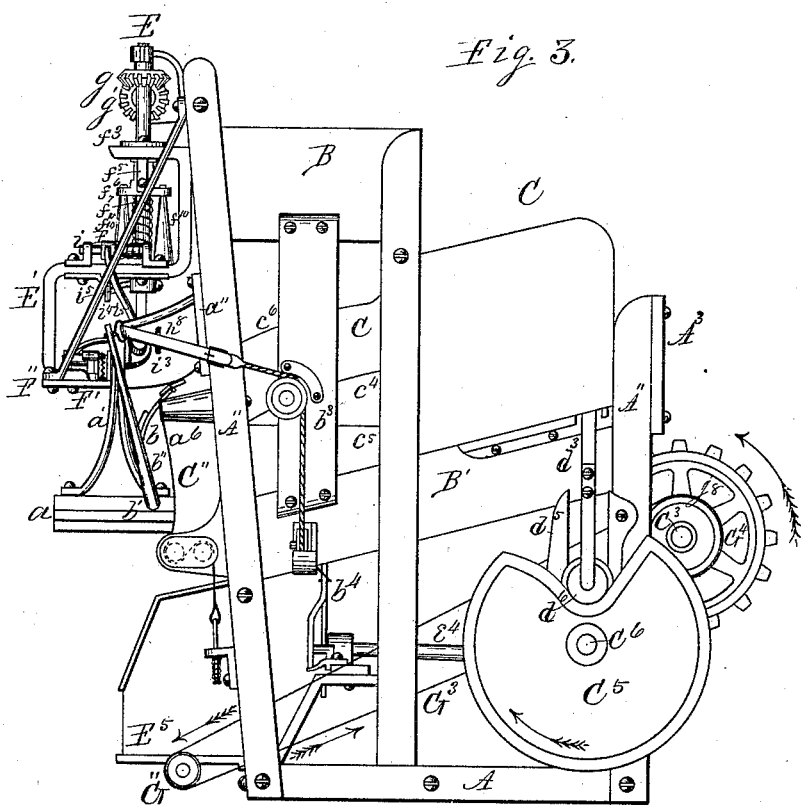
Figure 4:
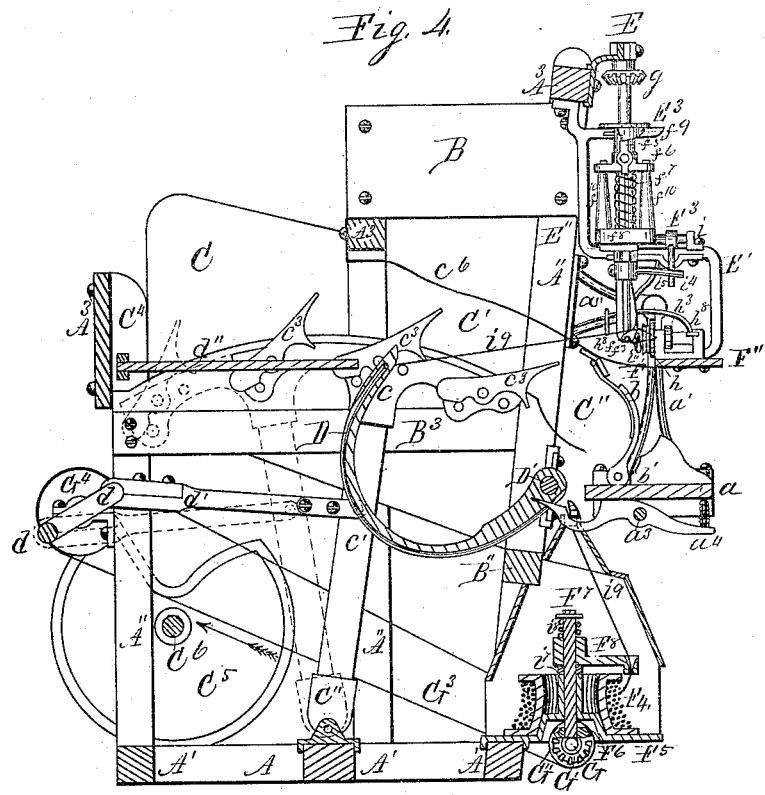
Figure 5:
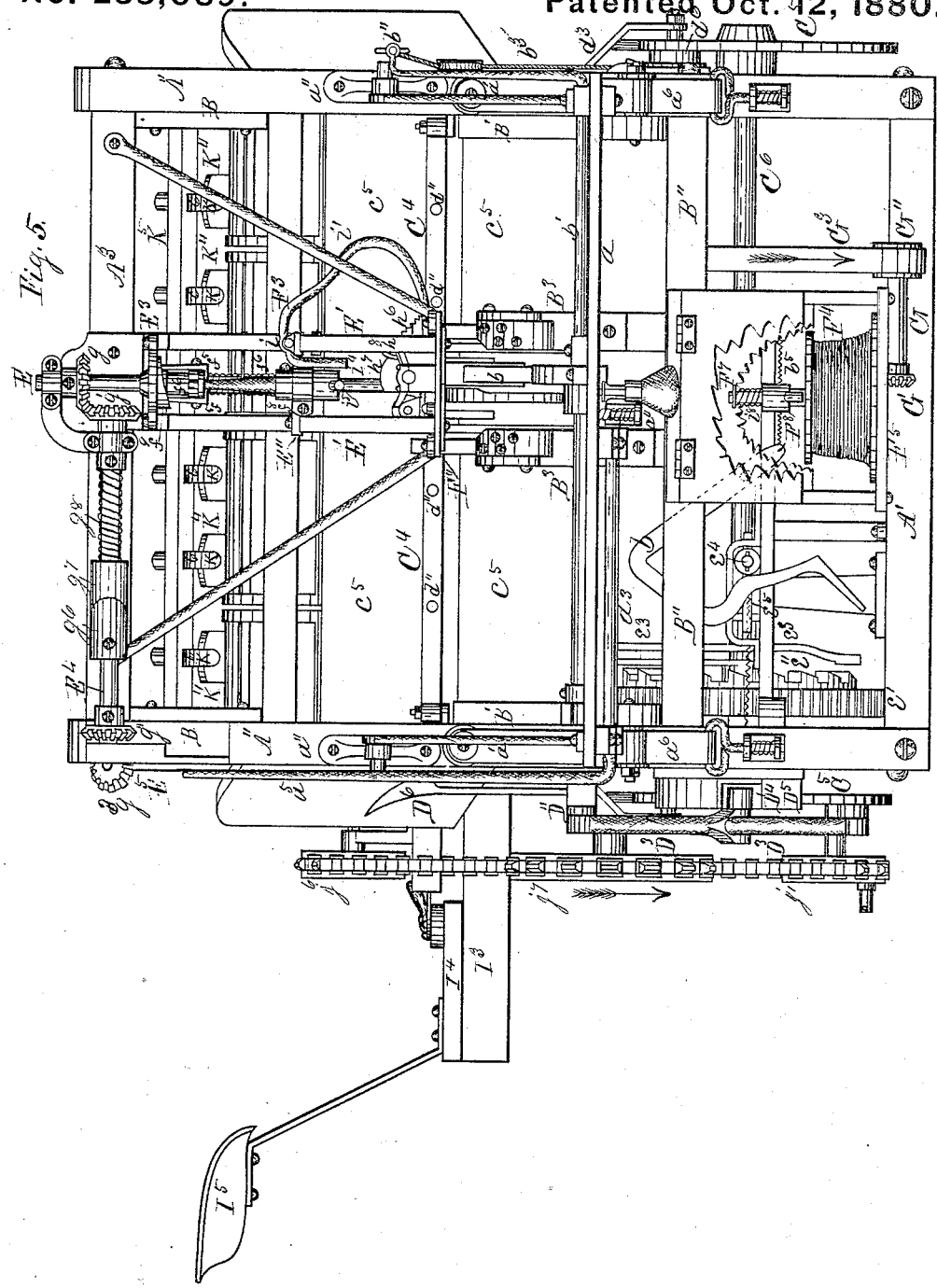
Figure 6:
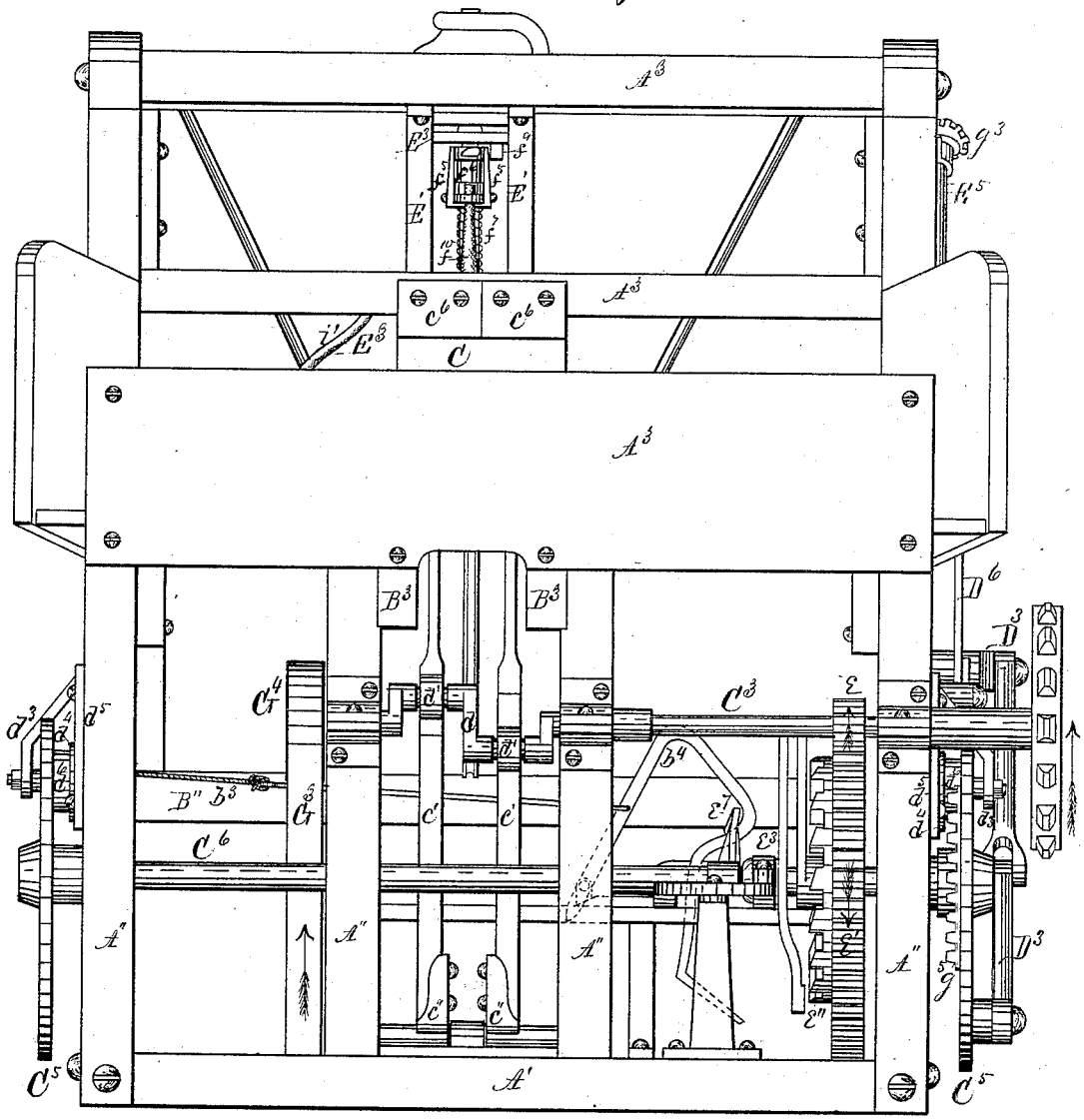
Figure 7:
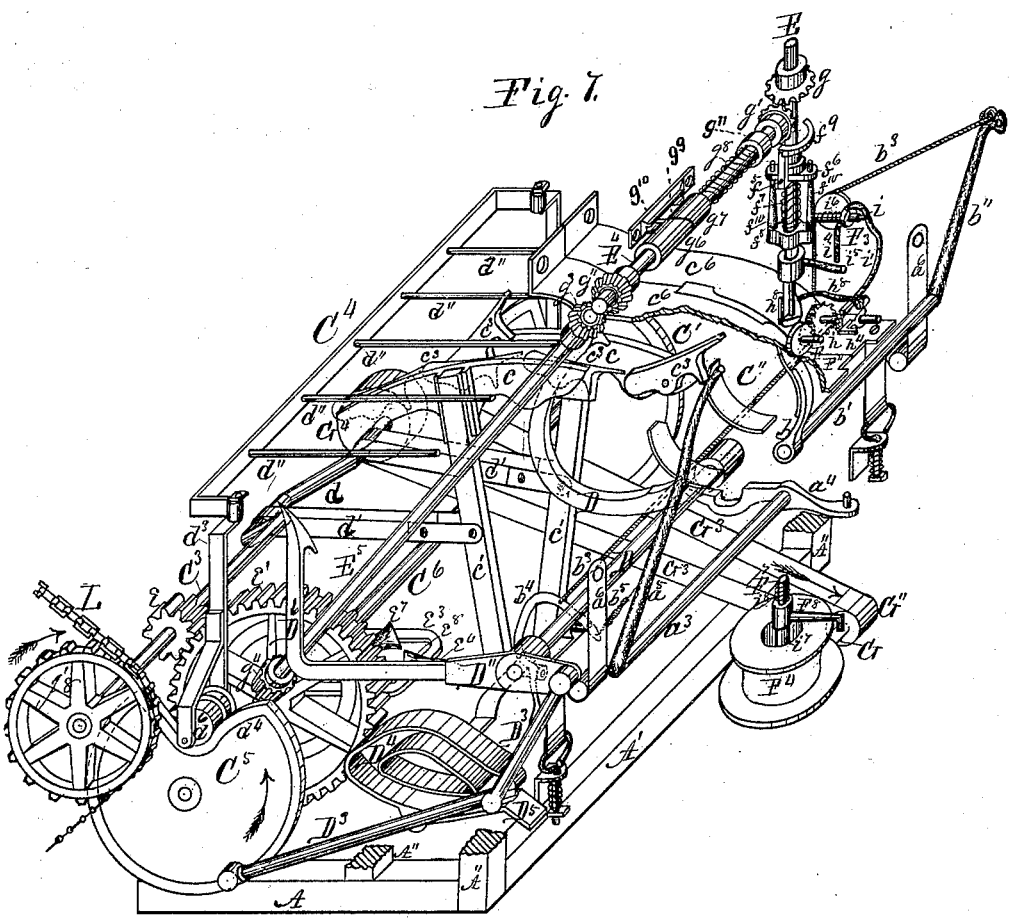
Figure 16:
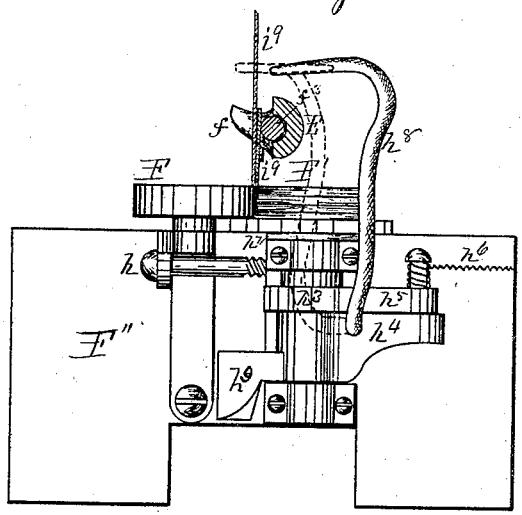
Figure 17:
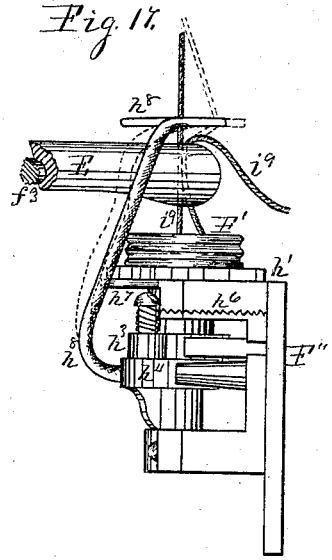
Figure 20:
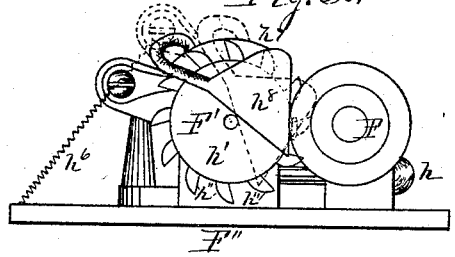
Figures 18, 19:
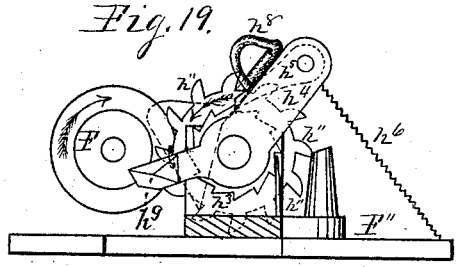

In the accompanying drawings, Figure 1 is a plan view of the binding-machine. Fig. 2 is a rear elevation of the same; Fig. 3, a front elevation; Fig. 4, a vertical central section parallel with the front and rear elevations; Fig. 5, an elevation of the delivery end, and Fig. 6 an elevation of the receiving end, of the binding-machine; Fig. 7, an isometrical projection of the working parts, omitting nearly all of the frame. Fig. 8 is a rear elevation, in skeleton, in which the dotted lines show some of the positions of the parts in working. Fig. 9 is an inside face view of the cam-wheel on the rear side of the machine. Fig. 10 is a vertical section of the knot-tying device. Fig. 11 is an upper face view, and Fig. 12 an under face view, of the upper bearing in which the knot-tyer revolves. Fig. 13 is a skeleton plan of the automatic shipping device and of the parts immediately connected therewith. Fig. 14 is a skeleton side elevation of the same; Fig. 15, an elevation of the trip-lever as viewed from the delivery end of the machine. Fig. 16 is a plan view of the cord-holding device and of the parts immediately connected with it. Fig. 17 is a side elevation of the same; Fig. 18, an outer end elevation in position to receive the cord; Fig. 19, a similar elevation, in which the cord is turned into the holder; and Fig. 20 is an inner end elevation, in which the dotted lines show the parts in position, as in Fig. 19.

In the several figures, A represents the front and rear sills of the binder-frame, which are connected by cross-sills A', which join the side sills at right angles and form the base-frame, into which are secured the posts A'', which, in pairs, differ in height, each pair being connected by cross-beams $A^3$. The two outer and center posts are connected at their upper ends on each side by beams B, and the three posts on each side are connected by an inclined beam, B'. The outer posts are connected some distance from their lower ends by a beam, B''. The receiving and delivery ends of the frame are connected by central lengthwise beams, $B^3$. These parts, connected as above described, and shown in the drawings, constitute that portion of the frame of the machine which supports the binding mechanism and to which the revolving parts are properly fixed in working bearings.

$a$ represents a binding-table supported on swinging brackets $a'$, hinged to brackets $a''$, secured to and projecting from the outer face of the posts at the delivery end of the binder.

$a^3$ is a rock-shaft supported in bearings at the end and center of the table. Its inner end, at the center of the table, is fixed to the spring-latch $a^4$, the inner hooking end of which engages a strike-block secured to the frame, and serves to hold the table in contact with the frame.

$a^5$ is a lever-arm of the rock-shaft $a^3$, which rises above the table. If moved inward this arm will disengage the spring-latch $a^4$ from the strike-block and permit the table to swing outward and upward from the frame. If the inward movement be continued the table will be carried outward and upward, as in dotted lines in Fig. 8, from which position, if let drop, the latch will again connect with the strike-block and hold the table in connection with the frame.

$a^6$ are buffers, consisting of belting, secured at their upper ends to studs projecting from the outer face of the posts, from which they pass downward under and over rollers in S form, and having their lower ends provided with a spring tension device and regulating-screw by which to regulate their resisting capacity. These buffers receive the outer ends of the binding-table as it drops, arrest its downward motion, and reduce the concussion.

$b$ is a yielding arm which forms the outer portion of the gavel-receptacle in which the bundle is formed, and is employed to operate a trip-lever detent to connect the binding devices with the movements of the driving-shaft when a sufficient quantity of grain has accumulated in the gavel-receptacle to form a bundle. This yielding arm is fixed to a shaft, $b'$, having its bearings in the binding-table. The outer end of the shaft $b'$ is formed with an upturned lever-arm, $b''$, which is connected by a cord, $b^3$, to a trip-lever detent, $b^4$, in such a manner that the pressure of the gavel against the yielding arm will operate to connect the binding devices with the moving parts of the harvester, to put in motion the binding devices, to encircle the gavel with the binding material, bind the bundle, and discharge it from the machine. The trip-lever detent is actuated in opposition to the action of the yielding arm by a spring, $b^5$.

$c$ are segments fixed to the radial arms $c'$, which are pivoted at their lower ends, at $c''$, to the lower central cross-beam of the frame, near its lengthwise center, the pivotal joint $c''$ in the arms being in the center, from which the curves of the segments are formed.

$c^3$ are feed-dogs pivoted to the segments at proper intervals, and in such a manner that in their forward movements toward the gavel-receptacle their forked forward ends will be thrown outward above the periphery of the segment to gather and carry the grain with their forward movement into the gavel-receptacle, and in their rear movements their forward ends will drop to, or nearly to, the periphery of the segments and pass under the grain, to again rise, gather, and carry the grain with them in their forward movements. These feed-dogs are limited in their vibratory movements on their pivotal connection with the segments by slides projecting from the side of the segments with which the dogs come in contact. These segments oscillate between the lengthwise center beams, the upper surfaces of which are provided with arching pieces $c^4$, which are of the same curve as the segments. The spaces on each side of the lengthwise central beams are provided with bottoms $c^5$, which incline toward the delivery end of the machine, and are employed to insure the complete discharge from the machine of all fine or short cuttings or straggling straws that drop from the ends of the cut grain as delivered by the harvester into the grain-receiver, C being that portion of the binding-machine between the center frame and the receiving end of the machine above the inclined bottom $c^5$.

$c^6$ are curved guide-bars extending from the center frame, above the curved segments, to the delivery end of the machine, where their curved portion connects with the gavel-receptacle, and, with the arching pieces $c^4$ on the lengthwise center beams, form the throat $C'$, through which the cut grain from the grain-receiver is forced by the feed-dogs on the segments into the gavel-receptacle $C''$.

$C^3$ is a crank-shaft, fitted with two opposite cranks, $d$, which receive the pitmen $d'$, that connect them to the radial arms of the segments, through which, from a rotary movement of the crank-shaft, an oscillatory movement will be imparted to the segments in opposite directions at the same time.

$C^4$ is a cut-off rack, constructed with a series of fingers, $d''$, which extend quite across the receiver and receive the cut grain as it is delivered from the harvester. This rack, in its lowest position, rests on a plane below the segments which carry the feed-dogs, to permit them to play above the fingers in contact with the cut grain, which they carry through the throat $C'$ into the gavel-receptacle $C''$ by means of the oscillatory movement imparted to them by the double crank. This cut-off rack is provided on each side of the machine with a depending arm, $d^3$, forked at its lower end, and fitted with friction-rollers, the inner one of which, $d^4$, is fitted to move up and down in guideways $d^5$, to give direction to its up-and-down movements. The outer rollers, $d^6$, are fitted to travel on the periphery of a cam-wheel, $C^5$, placed one on each side of the machine, fixed to the outer end of the cross-shaft $C^6$, with which it revolves. These cam-wheels, as represented in the drawings, are of disk form, circular in plan, having a sector-like portion of the disk cut from one side to permit the roller on which the rack is supported to drop toward the center of the disk to permit the rack to settle to its lowest position. When motion is imparted to the cams the roller will ascend the curved edge of the cut-out portion of the cam, which will cause the rack to ascend until the roller is supported on the periphery thereof. This will hold the rack and the cut grain thereon above the action of the feed-dogs, which will cut off the flow of the cut grain through the throat into the gavel-receptacle, by the action of the feed-dogs, until the cam-wheels have made one complete revolution, during which time the bundle will have been bound and discharged, and the machine will have arrived in position to receive another gavel.

In this machine the crank-shaft is made the driving-shaft, and is fitted with a toothed pinion, $e$, the teeth of which engage the teeth of a gear-wheel, $e'$, loosely mounted on the shaft $C^6$. On the side of this toothed wheel is fixed a ratchet-wheel, $e''$.

$e^3$ is a clutching device fitted to slide lengthwise on the shaft $C^6$, and adapted to engage the teeth of the ratchet-wheel. This clutching device is operated by an automatic shipping-lever, $e^4$, which, when released from the trip-lever detent $b^4$, will be caused by the action of the spring $e^5$ to slide the clutching mechanism on the shaft $C^6$ to engage the teeth of the ratchet-wheel, through which motion will be imparted to the cam-wheel.

$e^6$ is an automatic shipping-arm fixed to the cam-shaft $C^6$, having its free end provided with an inclined blade, $e^7$, which, in each revolution of the shaft, comes in contact with a like inclined blade, $e^8$, formed on the shipping-lever $e^4$, and in passing operates to slide the clutching device on the shaft and disengage the clutching-arm from the teeth of the ratchet-wheel. In this operation, in the dropping of the cut-off rack $C^4$, the outside friction-rollers $d^6$ descend on the forward inclined wall of the cut-out portion of the cam, and continue their movements until the inclined blades $e^7$ and $e^8$ have fully passed each other. This action of the inclined shipping-blades and the descent of the cut-off rack on the forward inclined wall of the cut-out portion of the cams will carry the free end of the shipping-lever $e^4$ into such a position as to permit the trip-lever $b^4$ to engage its free end and hold the clutching device disengaged from the teeth of the ratchet-wheel.

D is a cord-carrying arm, curved in the form represented in the drawings, and is grooved throughout its length nearly, mainly on its convex surface, in which groove the binding-cord is received in such a manner as to protect it from contact with the grain. Its forward or free end is pierced, forming an eye through which the binding-cord is passed to the cord-holder. This cord-carrying arm is mounted on and near the inner end of the shaft D', placed on the rear portion of the delivery end of the machine in such position that the cord-carrying arm will be about in the vertical center of the machine, and between the segments carrying the feed-dogs.

The outer end of this shaft, on the rear side of the machine, is fitted with the cross-arm D''. Its outer short arm is connected to the cam-wheel $C^5$, on the rear side of the machine, by jointed connecting-rod $D^3$, pivoted to the cross-arm and cam-wheel by wrist-pin connections. The center joint of this connecting-rod is fitted with a friction-roller adapted to traverse in the direction of the arrows the cam-grooves in the cam-plate $D^4$, fixed to the rear side of the frame. This hinged connecting-rod and the open-end cam-grooves permit the feed-dogs to make several strokes after the cut-off rack is raised, to surely carry all the grain below the rack forward of the cord-carrying arm before it rises, that it may completely encircle all the grain below the rack, to make a complete separation of the grain to be bound from the inflowing current. This cam is fitted with a hinged portion, $D^5$, provided with a spring-bolt to hold it in position, and by means of which it may be dropped. This will permit the cord-carrying arm to be raised for the purpose of threading the arm, or any other purpose.

The free end of the cross-arm D'' is provided with the bent hooking-arm $D^6$, which is adapted to swing upward and outward and overlap the lever-arm $a^5$. On its return or backward movement its hooking end will engage the lever-arm and carry it with its backward movement to disengage the spring-latch $a^4$ and swing the binding-table outward and upward, as indicated in dotted lines in Fig. 8, which will permit the bound bundle to drop from the receptacle. Its continued backward movement will cause the hook to pass over the end of the lever, thus permitting the binding-table to drop, and the spring-latch to engage the strike-block and hold the table in position to receive another gavel.

It will be observed that the cord-carrying arm and the hooking arm $D^6$ being fixed to the same shaft, their forward movement will be in unison, and will be continued forward during the forming of the knot, in which movement the rear portion of the cord-arm will compress the gavel, which will furnish slack in the cord to form the loop of the knot.

E represents the shaft of the knot-tyer. Its lower end is made hooking, forming a bill, $f$, round which the cord is formed in a loop in tying the knot. The lower portion of this shaft is centrally bored lengthwise, as at $f'$, and is cut away on the hook side above the hook into the center bore, as at $f''$, and the lower side of the hook is grooved to receive the cord-hook.

$f^3$ is the cord-hook, inserted in the center bore of the shaft, having its lower end bent in hook form to enter the groove in the under side of the sill $f$. The middle portion of the knot-tying shaft is slotted lengthwise, as at $f^4$, to receive the grasping-jaws of the clamping-arms $f^5$, which are fixed with clamping-screws to the sleeve $f^6$, to firmly grasp the upper portion of the cord-hook and to slide lengthwise with the sleeve on the knot-tying shaft.

By this arrangement the cord-hook can be made to slide lengthwise in the center bore of the shaft. A spiral spring, $f^7$, is placed between the fixed collar $f^8$ and the sliding sleeve $f^6$, to hold the cord-hook up in the groove in the hooking-bill of the knot-tyer.

From the fixed collar $f^8$ rise two pillars, $f^{10}$, having their upper ends fitted to receive the bored ears which project from the sliding sleeve $f^6$, in which they slide freely, and are employed to cause the fixed collar and the sliding sleeve to revolve together with the knot-tying shaft to prevent friction of the clamping-jaws $f^5$ on the slotted sides of the knot-tying shaft. This knot-tying shaft is supported in a bracket-like frame, E', fixed at its upper end centrally to the outer face of the beam which connects the upper ends of the posts at the delivery end of the machine, and at its lower end to the outer horizontal portions of the curved guide-bars $C^6$. The bearings E'' and $E^3$, in which the shaft of the knot-tyer is fitted to revolve, are fixed to the bracket-like frame. The bearing $E^3$ is fitted on its under side with an inclined cam, $f^9$, which, in connection with a stud-like arm projecting from the side of the upper end of the sleeve $f^6$, is employed to open the cord-hook to receive the cord by sliding the sleeve downward during the last half of its revolution, and to permit the cord-hook to close on the cord just before the shaft has made one complete revolution. This is accomplished by permitting the stud-like arm to pass and rise by the end of the cam $f^9$, to regulate which the bearing $E^3$ is made adjustable in its fastenings by means of slotted ears, as shown in the drawings. The upper end of the tying-shaft is fitted with a miter-gear wheel, $g$, the teeth of which engage with the teeth of a like gear-wheel, $g'$, on the shaft $E^4$, supported in bearings on the upper cross-beam at the delivery end of the machine and extending to the rear side thereof, where its rear end is fitted with a miter-gear wheel, $g''$, the teeth of which engage the teeth of a like gear-wheel, $g^3$, on the upper end of the oblique shaft $E^5$, supported in bearings on the rear side of the machine and having its lower end fitted with a bevel-gear wheel, $g^4$, the teeth of which engage the teeth of the beveled toothed segment $g^5$ on the inside face of the cam-wheel $C^5$ on the rear side of the machine. This toothed segment is made adjustable on the cam-wheel to time the movements of the knot-tyer.

The horizontal shaft $E^4$ is fitted with a spring clutching device consisting of the parts $g^6$ and $g^7$, constructed to meet about centrally of their length in an oblique spiral joint, of which the part $g^6$ is fixed to the shaft, with which it revolves, and the part $g^7$ is fitted to slide lengthwise on the shaft. This part $g^7$ is provided with an arm, $g^9$, (see Fig. 7,) which projects outwardly from one side thereof and engages in a grooved guideway, $g^{10}$, fixed to the frame, the parts being arranged so that the arm $g^9$ may slide lengthwise of the shaft and prevent the part $g^7$ from rotating. A spiral spring, $g^8$, encircles the shaft, one end of the spring resting against the part $g^7$ and the other against an adjustable collar, $g^{11}$. The spring $g^8$ exerts its force against the movable portion $g^7$ of the clutch to retain it in snug frictional contact with the stationary portion $g^6$ of the clutch.

When rotary motion is imparted to shaft $E^4$ by the engagement of the bevel-gear wheel $g^4$ on shaft $E^5$ with the toothed segment $g^5$, the portion $g^6$ of the clutch is revolved, and during the first half of the revolution of the shaft the sliding portion $g^7$ of the clutch will be moved lengthwise on its shaft against the force of the spiral spring $g^8$, while throughout the last half of the revolution of the shaft the spring will serve to move the sliding portion $g^7$ of the clutch toward the stationary portion $g^6$. This clutch mechanism is employed for the following purpose: After the bevel-gear $g^4$ on shaft $E^5$ has had a complete rotation imparted thereto by the toothed segment $g^5$ it is entirely disengaged from said toothed segment until the cam-wheel $C^5$ has made another complete revolution. During this interval of time it is necessary to retain the knot-tying mechanism in a stationary position and hold the hooking-bill of the knot-tyer in proper position for receiving the binding-cord, and also prevent any accidental rotation of the shafts $E^4$ and $E^5$, so that the toothed segment will, upon the next succeeding engagement with the bevel-gear $g^4$, impart one complete revolution thereto, and always be disengaged therefrom at the same point in its rotation. These results are effected by means of the sliding-clutch portion $g^7$ being forced in snug frictional contact with the stationary portion $g^6$ and holding the latter against any accidental rotary movement.

In the cord-holder, F represents an elastic wheel, and $F'$ a metallic wheel, fitted to revolve with their peripheries in contact and in the same vertical plane, and supported in bearings mounted on the bed-plate $F''$ and held in contact by an adjusting screw-bolt. This bed-plate is held in position relatively with the knot-tyers on the horizontal portion of the curved guide-bars $C^6$. The metallic wheel is fitted on its outside with a belay-wheel, $h'$, in which are formed belay-teeth $h''$.

$h^3$ is a ratchet-wheel fixed to the shaft on which the metallic wheel $F'$ is mounted; and $h^4$ is a lever-arm pivoted loosely on the same shaft, having a pawl, $h^5$, pivoted to the outer end of its outer arm, said pawl having its inner end fitted to engage the teeth of the ratchet-wheel $h^3$.

The inner end of the pivotal lever $h^4$ is formed with an enlargement, as at $h^9$, which is depressed, as shown in Fig. 19, by the outer end of the cord-arm in its outward movement to encircle the gavel with the binding-cord, which it places between the wheels F and $F'$ of the cord-holders. The depression of the inner end, $h^9$, of the lever $h^4$, in connection with the ratchet-wheel and spring-pawl, will cause the wheels of the cord-holders to rotate in the direction of the arrows, which will carry the binding-cord down between the wheels and between the belay-teeth. When the cord-carrying arm is withdrawn the cord will be wound over a belay-tooth and back between the cord-holding wheels, and the lever, with the spring-pawl, will be carried, by the action of the spring $h^6$, to its normal position, as shown in Figs. 16, 17, 18, and 20.

$h^7$ is a fixed guard-plate, which rises on the outside of the belay-wheel and serves to direct the binding-cord carried by the carrying-arm into or between the proper teeth of the belay-wheel.

$h^8$ is a cord-depressing arm fixed to the pivoted lever $h^4$, and suitably curved in such a manner that its plate-like end may extend inside of the knot-tyer to depress the cord between the knot-tyer and the bundle at the proper time and in the proper manner, so that the hooking-bill $f$ of the knot-tyer, in turning to form the loop, will turn over the cord to form the knot-loop in both cords that encircle the bundle.

Instead of the ratchet-wheel $h^3$, a pawl may engage the teeth in the belay-wheel. Other methods may be employed to impart an intermitting movement to the cord-holding wheel or wheels, and other devices may be employed instead of the elastic wheel so long as the cord-holding wheel and the belay-wheel have a positive intermitting movement to seize and hold the cord.

$F^3$ represents a knife, employed to cut the cord between the cord-holder and the knot-tyer. $i$ represents a rock-shaft fitted to oscillate in bearings on the bracket-like frame E'. To this rock-shaft is fixed the curved arm $i'$, one arm of which curves forward, downward, and rearward below and between the cord-holder and the knot-tyer, where it is fitted with a knife, $i^2$, which projects upward from the arm and in position, if moved rearward by oscillating the rock-shaft, to cut the cord between the cord-holder and knot-tyer. This arm is provided with an upward-curving arm, $i^3$, which, as the arm is moved to cut the cord, will engage the cord on the inside of the knot-tyer and force the knot over the hooking-bill $f$ of the knot-tyer and relieve the knot from the tyer. $i^4$ is a depending branch of the arm, which is fixed to the rock-shaft and extends downward on its rear side.

$i^5$ is a sweep-arm, which projects from a collar fixed to the knot-tying-shaft, which, in the revolution of the knot-tyer, comes in contact with the depending arm $i^4$ and imparts a swinging motion to the knife, which cuts the cord and forces the knot from the hooking-bill. As the sweep-arm passes under the depending arm $i^4$ the coiled spring $i^6$, wound on the rock-shaft, will force the knife back to its position of rest ready for another operation.

The position of the cord-depressing arm $h^3$, in depressing the cord to be operated upon by the knot-tyer, is shown in the dotted lines in Figs. 16, 17, and 20, and in solid lines in Fig. 19.

$F^4$ represents the non-revolving spool on which the binding-cord is wound, and from which it is taken by the movements of the cord-carrying arm in the proper quantity and at the proper time to bind the bundles. In this instance this spool is placed at the delivery end of the machine, centrally, and near its base, in the position represented, and is supported on a platform, $F^5$, which is formed with a central upward-projecting portion, and a tubular stud, $i^7$, which projects up through the center opening of the spool.

$F^6$ is a miter-gear wheel fixed on the lower end of the shaft $F^7$, which extends upward through the tubular stud on the base-plate, in which it is fitted to revolve.

$F^8$ is a crane-like arm fitted loosely on the shaft $F^7$, to rest on the upper end of the tubular stud $i^7$, and is held in position with sufficient force to regulate the tension on the binding-cord by means of a spiral spring, $i^8$, the force of which can be increased or lessened by means of a screw-nut, or by applying washers to compress the spring, or removing them to lessen its force. This crane-like arm extends over the spool, having its outer end fitted with an eye, through which the cord $i^9$ is passed from the spool to the shoulder of the cord-carrying arm, where it is passed through an eye into the groove therein, which it follows to the point of the arm, where it emerges through an eye, and from thence across the throat at the mouth of the gavel-receptacle to the cord-holder, in which it is held, as hereinbefore stated.

G represents a horizontal shaft, on one end of which is placed a miter-gear wheel, G', the teeth of which engage the teeth of the miter-gear wheel $F^6$. The opposite end of this shaft is provided with a pulley, G'', which receives the belt $G^3$, which passes over the pulley $G^4$ on the crank-shaft $C^3$ at the receiving end of the machine. By this arrangement it will be seen that if motion be imparted to the driving crank-shaft $C^3$ it will impart motion to the vertical shaft $F^7$ in the direction opposite to that indicated by the arrow on the spool in Fig. 13; and if the binding-cord $i^9$ be drawn from the spool its action will carry the crane-like arm in the direction of the arrow, which will be opposite to that imparted to the vertical shaft $F^7$, on which it is mounted. These opposite forces will always take up any slack in the cord, keep it taut, and its tension can be regulated by means of the spring above the crane-like arm, as hereinbefore stated.

This binding-machine is designed to be attached to a harvester, and connected with its movements by chain-belt, or in any other suitable manner, by which motion may be imparted to the driving-shaft of the binder, and the harvester of such construction as to deliver the cut grain into the receiving-chamber C of the binder, from which it is carried through the throat C' into the gavel-receptacle C'', by the action of the oscillatory segments $c$ and the feed-dogs, against the yielding curved arm $b$, until said arm is forced outward by the compression of the accumulating grain to such an extent that the trip-lever $b^4$ is disengaged from the shipping-lever $e^4$. By the action of the spring $e^5$ the clutching device $e^3$ is then thrown into connection with the ratchet-wheel $e^2$. This will set in motion the cam-wheels $C^5$, the first movement of which will raise the cut-off rack $C^4$ and stop the flow of the grain into the receptacle, except what may be in the throat, which will be forced into the receptacle forward of the cord-carrying arm D. The revolution of the cam-wheel, by means of the connecting-rod $D^3$, will cause the cord-carrying arm D to vibrate upward and outward, carrying with it the binding-cord to encircle the gavel. The movement of the cord-carrying arm will compress the bundle, carry the cord over the hooking-bill of the knot-tyer, deposit it in the cord-holding wheels F F', and cause them to revolve to take the cord in between them, and will depress the cord between the knot-tyer and the bundle by means of the cord-depressing arm $h^3$. The knot-tyer will then revolve to form the knot, and the cord will be cut between the cord-holder and the knot-tyer. The knot will be forced from the hooking-bill by the swinging movement of the curved knife-arm $i'$. The backward movement of the cord-carrying arm will return the cord over the cord-holding wheels around a belay-tooth. The spring-latch $a^4$ will be disengaged. The binding-table $a$ will be caused to swing outward and upward to discharge the bound bundle. The table will then be allowed to drop, and the spring-latch to engage the strike-block. The cut-off rack $C^4$ will drop to its lowest position. The clutching device will disengage from the ratchet-wheel to permit the trip-lever to engage the shipping-lever $e^4$, at which point the machine will be in readiness for a second operation.

The feeding-segments with their appendages, the swinging binding-table, its operating hooking-arm, the knot-tyer, the cord-holder, the non-rotating cord-spool with certain appendages, the cut-off rack and operating devices, and other features herein shown and described, but not claimed, form the subject of Patent No. 159,506, granted to M. L. Gorham February 9, 1875, and hence no claim to such parts of the machine is herein made.

Having fully described my invention, what I claim as new, and desire to secure by Letters Patent, is—

1. In a grain-binding machine, the combination, with the cord carrying and compressing arm, of a metallic arm and mechanism connecting the said arm with tripping mechanism for automatically actuating the cord-tying mechanism, said yielding arm arranged and adapted to act in opposition to the cord-carrying arm and constituting the outer portion of the gavel-receptacle, and adapted to impart the desired form to the outer side of the bundle, thereby lessening the strain on the binding cord or wire, and yield to any desired extent to insure the formation of bundles of uniform size and form, substantially as set forth.

2. In a grain-binding machine, the cord carrying and compressing arm and yielding arm arranged and adapted to act in opposition to the cord-carrying arm, said yielding arm being secured at one end to a rock-shaft and constituting the outer portion of the gavel-receptacle, and adapted to impart the desired form to the outer side of the bundle, thereby lessening the strain on the binding cord or wire, in combination with an automatic grain-feeding device and intervening mechanism connecting the yielding arm with the moving parts of the machine, the several parts being arranged substantially as set forth, whereby the binding mechanism is automatically put in operation, substantially as set forth.

3. In a grain-binding machine, a cord carrying and compressing arm and yielding arm, the latter secured at one end to a rock-shaft and constituting the outer portion of the gavel-receptacle, and adapted to act in opposition to the cord-carrying arm to impart the desired form to the outer side of the bundle, thereby lessening the strain on the binding cord or wire, in combination with an automatic feeding device and a trip-lever to release the spring-clutch and engage the ratchet-wheel to impart motion to the binding mechanism, substantially as set forth.

4. In a grain-binding machine, the combination, with a cord carrying and compressing arm and a yielding arm adapted to act in opposition to the cord-carrying arm and constitute a portion of the gavel-receptacle, and against which the grain is fed and bundle formed by an automatic feeding device, thereby lessening the strain on the binding cord or wire, of a trip-lever to release the spring-clutch and engage the ratchet-wheel to impart motion to the binding mechanism, substantially as set forth.

5. The combination of a curved and grooved cord-carrying and gavel-compressing arm and the cross-arm $D''$, fixed to the same shaft, the jointed side connection pivoted to the cross-arm and cam-wheel, and its jointed portion fitted to traverse the cam-grooves in the plate $D^4$, substantially as and for the purpose hereinbefore set forth.

6. The combination, with the cam-wheel, cross-arm with bent hooking-arm $D^6$ attached thereto, and upwardly-extending lever-arm $a^5$, of a jointed connecting-bar, a cam-grooved plate, and a stud or anti-friction roller located at the joint in the connecting-rod and arranged to travel in the cam-grooved plate, substantially as set forth.

7. The combination, with the binding-table, of the buffers herein described, substantially as and for the purpose hereinbefore set forth.

8. The combination, with a turning knot-tyer, of the cord-depressor operating to depress the cord between the knot-tyer and the bundle to be bound, to permit the hooking-bill of the tyer to turn over both cords in forming the knot-loop.

9. The combination, with the crane-like tension-arm $F^3$, of the gear-train and belt-connection with the driving crank-shaft, as and for the purpose hereinbefore set forth.

10. The combination, with the jointed connecting-rod, of the cam-grooved plate $D^4$, provided with hinged drop $D^5$, as and for the purpose hereinbefore set forth.

11. The combination, with the driving-shaft, which imparts motion to the binding mechanism, of the oblique-faced spring-clutch consisting of part $g^6$, rigidly secured to the shaft, and part $g^7$, provided with an arm which engages in a guide on the frame, the part $g^7$ adapted to have a sliding movement on the shaft, and spring $g^8$, located on the shaft between a collar fixed thereon and the sliding part $g^7$ of the clutch, substantially as set forth.

HELEN M. GORHAM.

Witnesses:
THOMAS FERGUSON,
A. O. BEHEL.